INVENTORS
N. BROADBENT
K. G. READ
BY Fetherstonhaugh & Co.
ATTORNEYS

INVENTORS
N. BROADBENT
K. G. READ
BY Fetherstonhaugh & Co.
ATTORNEYS

INVENTORS
N. BROADBENT
K.G. READ
BY Fetherstonhaugh & Co
ATTORNEYS

United States Patent Office 3,435,348

Patented Mar. 25, 1969

3,435,348

DUAL RANGE VHF RECEIVER

Norman Broadbent, St. Dorothee, Quebec, and Kenneth G. Read, Montreal, Quebec, Canada, assignors to Canadian Marconi Company, Montreal, Quebec, Canada Filed Sept. 29, 1965, Ser. No. 491,234
Claims priority, application Canada, June 11, 1965, 933,094
Int. Cl. H04b *1/16, 1/06*
U.S. Cl. 325—453 2 Claims

ABSTRACT OF THE DISCLOSURE

In a duel range VHF receiver, a local oscillator which provides a frequency equal to the RF less the IF for the the low RF bands and a frequency equal to the RF plus the IF for the high RF bands, the load of said local oscillator comprising overcoupled resonant circuits.

This invention is concerned with radio receivers for use in the VHF (Very High Frequency) International Maritime Mobile Service and is aimed at providing simplified receivers capable of efficient operation on the two adjacent groups or bands of communication channels allocated to this service.

The two receiving bands presently assigned in this service are: Ship to Ship—156.3 to 156.8 megacycles per second (mc./s.), and Public Correspondence—160.65 to 162.0 mc./s. Because of the high frequencies involved great difficulty has been encountered in trying to design a receiver of the superheterodyne type capable of reception on both bands. The switching of tuned circuits is impractical at these frequencies and hence a choice of one or other of the following techniques has been resorted to in the past if reception in both bands is required; provide two separate receivers, one for each band; provide a receiver with two separate "front ends"—radio frequency amplifier, first detector and oscillator stages, each front end having a separate complement of tubes; or use broadly tuned "front end" stages and accept much degraded performance in respect to spurious responses. By the use of the first or second of the above expedients it is possible to obtain performance meeting the limits laid down by the various international regulatory bodies, but at the expense of very considerable complexity, bulk and cost. The performance attainable to date by the third expedient has failed to satisfy the requirements of at least some of the regulatory bodies, and any increase in band utilization will rapidly reduce in number those locations where the degraded performance capability available in the past can be tolerated.

It is therefore an aim of the present invention to provide a simple, dual range VHF superheterodyne receiver having a high standard of performance in respect to the rejection of spurious responses.

According to the invention there is provided a dual range VHF superheterodyne radio receiver adapted for reception on two adjacent bands having a radio frequency amplifying section and first detector section, an oscillator section, and an IF amplifier section, said radio frequency amplifying section being characterized in having a double peaked frequency response curve with the peaks falling each substantially in the centers of two adjacent reception bands, said oscillator section comprising a crystal oscillator having two sets of switchable crystals one set for reception of low band stations providing oscillations on the low frequency side of selected stations in said low band and the other set for reception of high band stations providing oscillations on the high frequency side of selected stations in said high band, and an amplifier stage in said oscillator section fed with said oscillations and having a load circuit coupled to said detector stage, said load circuit comprising two coupled resonant circuits coupled primarily by direct inductance coupling which is adjustable to that degree of greater than critical coupling providing two resonant responses one response being displaced on the low frequency side of the lower frequency response peak of said radio frequency amplifying and detecting section by an amount substantially equal to the frequency of said IF amplifier and the other response being displaced on the high frequency side of the upper frequency response peak of said radio frequency amplifying and detecting section by an amount substantially equal to the frequency of said IF amplifier.

The invention will be further explained and described with reference to the accompanying drawings in which.

Figure 1:
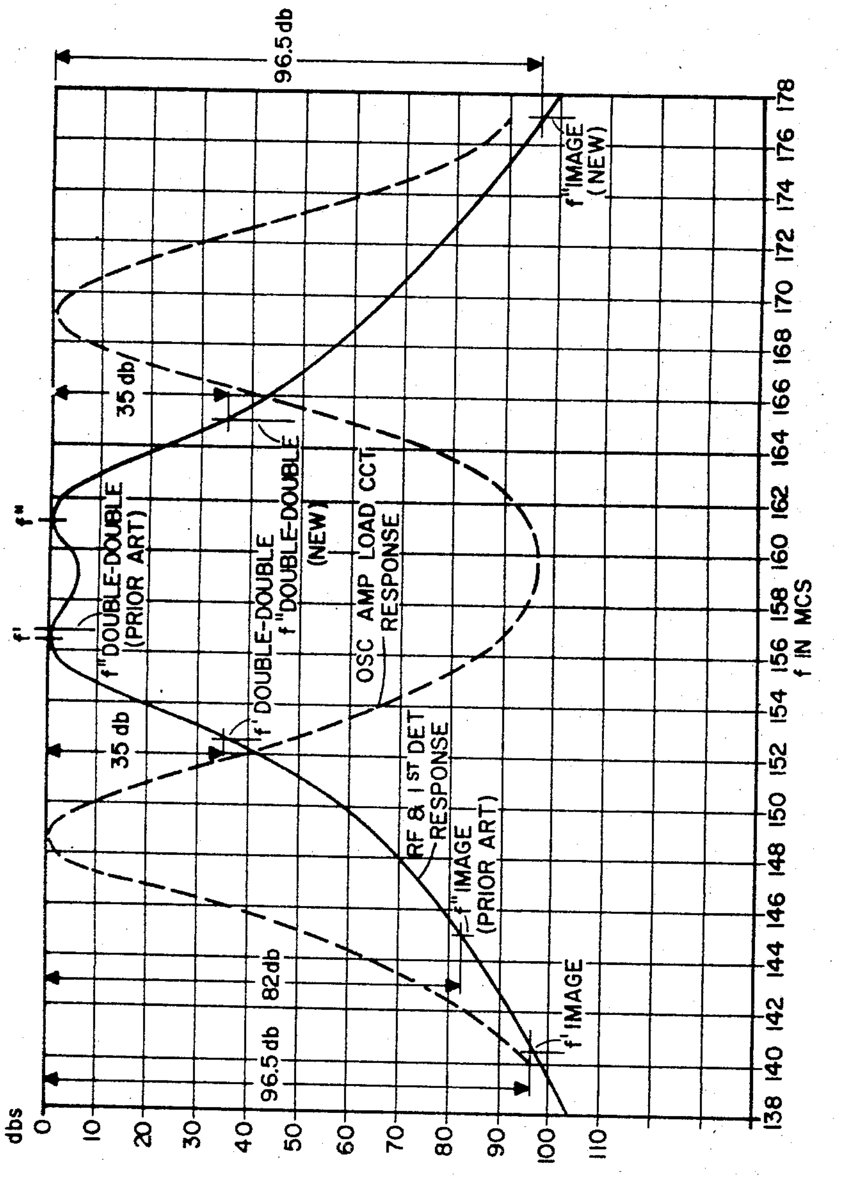
FIGURE 1 is an explanatory graph showing front end response curves.

Referring to FIGURE 1 the solid line curve shows the response of the radio frequency amplifier and first detector stage of a receiver in accordance with the invention and also in accordance with known prior art receivers of the single front end unswitched type. Values have been assigned as being representative of normal design practice. The points $f'$ and $f''$ represent the centers of the two assigned reception bands. Other points shown on the solid curve show the location of spurious responses as discussed below.

Of the multitude of theoretically possible spurious responses in a superheterodyne receiver the two most serious are the image response and the "double-double" response. The image response is that falling on the other side of the oscillator from that of the desired response and likewise distant from it by the frequency of the IF amplifier. Thus for a receiver tuned to $f'$ of 156.55 mc./s. and having an 8 mc./s. IF, the image will fall as shown on 140.55 mc./s. if the oscillator operates, as is normal, on the low side of the signal.

The "double-double" response is that resulting from the presence in the first detector of the second harmonics of the interfering signal and second harmonics of the local oscillator signal. When the difference in frequencies of these two second harmonic signals equals the intermediate frequency a spurious response is produced. Thus as shown, when the receiver is tuned to $f'$ it will respond to a signal $f'$ double-double at $$\frac{2f'-IF}{2}$$

or 152.55 mc./s. as shown. The response relative to that at $f'$ or $f''$ may be down by some 35 db.

Now suppose a receiver in accordance with the prior art, with the oscillator operating on the low side of the received signal, has its oscillator switched to the upper band to receive $f''$ at 161 mc./s. The image response now falls on 145 mc./s. marked $f''$ image (Prior Art) whereat it has a value of some −82 db rather than −96 db for the $f'$ case, and as such just fails to meet the usually stipulated value of −85 db. This value could be obtained by the use of more complex tuning circuits in the radio frequency and detector sections, but at the expense of additional complexity.

Consider, however, the response of such a prior art receiver to the $f''$ double-double spurious signal. This occurs at 157 mc./s. for the case considered, right at the edge of the lower band where the response is down only a fraction of a db. Indeed, when the receiver is tuned to the lower range of the upper band, the double-double spurious response of such a prior art receiver will fall right in the lower band and be attenuated not at all.

The right hand side of the solid line curve shows the operation of a receiver in accordance with the invention, the oscillator for upper band operation now being located above the signal frequency. As is apparent the performance of the invention with respect to spurious responses is the same on the upper band as it is on the lower, these responses being shifted in each case away from the part of the signal spectrum of interest.

It is apparent from the above that the operation of a VHF dual range receiver with the oscillator on alternate sides of the dual received signal bands produces a great improvement in performance over the prior art unswitched type of receiver. Whereas the desirability of such operation will be recognized by those skilled in the art, a way whereby such operation might be obtained in a receiver operating at this frequency is far from obvious.

In the present state of the art overtone crystals are required to be used in the oscillator. To achieve sufficient injection voltage for the first detector operation the relatively weak harmonic output of the various crystals must be amplified, and for such amplification a tuned load circuit is most desirable if not in fact mandatory. To be suitable for use in the present invention the load circuit must provide adequate impedance at two locations some 20 or more megacycles apart. A single tuned circuit, even if heavily damped, is unsuitable in that insufficient amplification is attainable, and switching between two or more tuned circuits is not feasible. According to the invention, therefore, the load circuit for the oscillator amplifier is comprised of two tuned circuits so overcoupled by the use of direct inductance coupling as to provide the double peaked response shown by the dashed curve of FIGURE 1.

At the frequencies here involved tuned circuit elements having capacity values of a few micro-micro-farads and inductance values of fractions of a microhenry are required. Minor variations in stray wiring capacitance and inductance which are inevitable in production, together with the necessary manufacturing tolerances on coils and capacitors require that some means be provided for not only tuning the load circuits of the oscillator amplifier but also for adjusting the mutual coupling to provide accurate peak response location. A preferred form of oscillator amplifier load circuit for use in the invention is shown in FIGURE 2.

Figure 2:
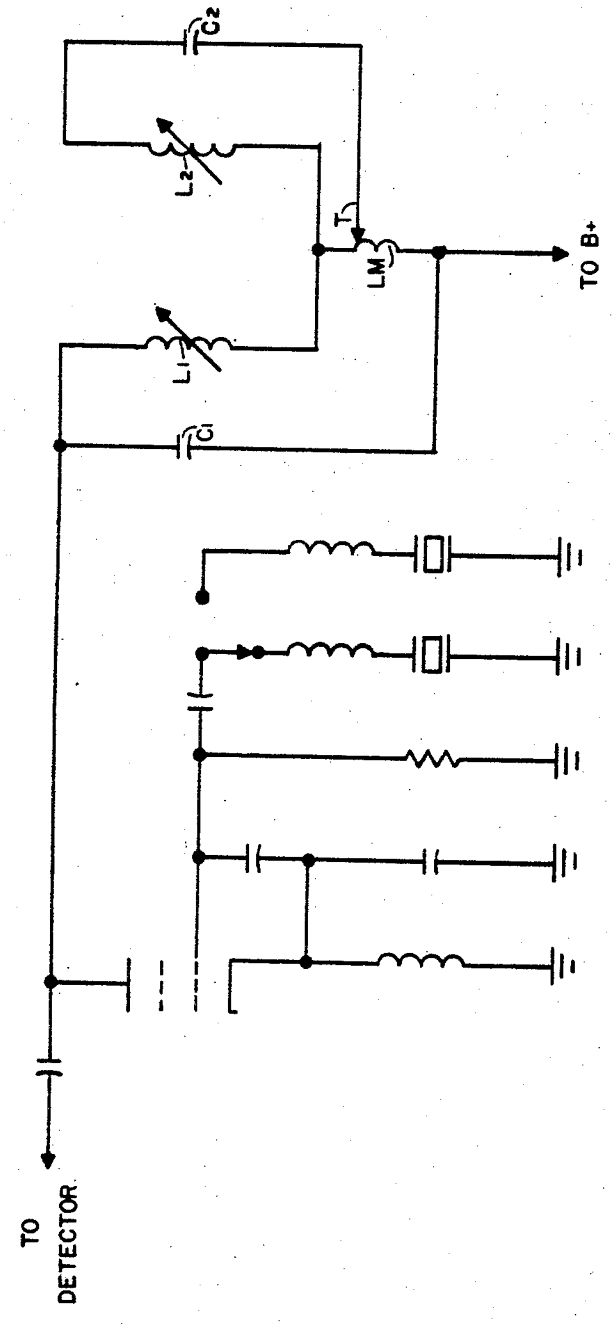
FIGURE 2 shows an oscillator circuit in accordance with the invention.

Referring to FIGURE 2 a tetrode tube is shown connected as a combined crystal oscillator and amplifier. Except for the plate load circuit, the arrangement of FIGURE 2 conforms to standard practice and is well known, and no description of the known circuitry is needed by those skilled in the art. The double peaked load circuit comprises two tuned circuits $L_1C_1$ and $L_2C_2$ together with a common inductance $L_M$. The windings constituting $L_1$ and $L_2$ are substantially the same, and at these frequencies may be constituted of 2 or 3 turns of some ¼ inch diameter with an adjustable iron core within, and are so spaced, say an inch apart coaxially, as to have small mutual inductance. The common inductance $L_M$ may be constituted of a length or loop of wire having a length in the order of an inch or less. Provision is made to connect one end of the capacitor $C_2$ to a selectable tapping point T on the inductance $L_M$, preferably by directly soldering a lead wire from $C_2$. A suitable method for tuning this circuit is as follows. An indicating meter is loosely coupled to the junction of $L_1$ and $C_1$, say through a decoupling capacitor connected to the tube plate, and a signal applied, say by injection at the number 1 grid of the tube. With the capacitor $C_2$ disconnected from the tap T, $L_1$ is adjusted for resonance of $C_1$ with $L_1$ plus $L_M$ at the center of the band, that is, referring to FIGURE 1, at 158.5 mc./s. The capacitor $C_2$ is then connected to a central point on $L_M$ and $L_2$ adjusted for a response peak at one of the desired peaks, again referring to FIGURE 1, at 148.5 mc./s. or 169.3 mc./s. as the case may be. A search is then made for the location of the other response peak. If this is not properly located a new tapping position is tried, increasing or decreasing the mutual inductance as is needed, $L_2$ again tuned, and the other peak again located, this process being repeated as required. In practice very little trial and error adjustment is necessary to achieve satisfactory results. It will, of course, be realized that the tetrode tube combined oscillator amplifier, arrangement is one form only of the many which could be used in the oscillator section of a VHF receiver in accordance with the invention.

Figure 3:
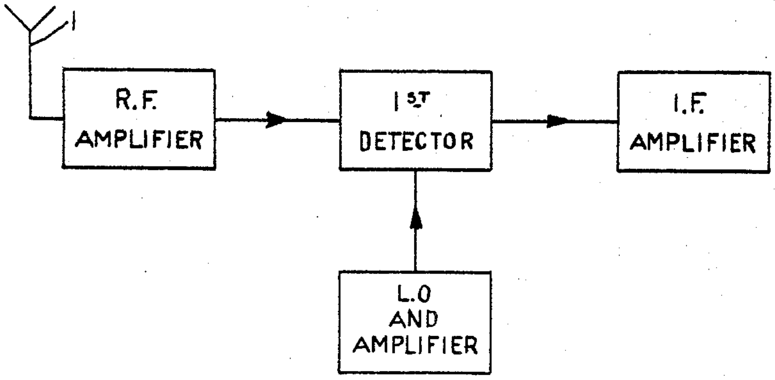
FIGURE 3 illustrates part of a receiver system in which the invention can be used.

FIGURE 3 illustrates a well known receiver system in which the novel oscillator and oscillator amplifier may be employed. In the normal manner, the antenna 1 provides the RF amplifier with an RF signal. The output of the RF amplifier is mixed with the output of the local oscillator to produce an IF signal which is amplified in the IF amplifier. It is contemplated, in accordance with the invention, to use the circuit of FIGURE 2 as the oscillator and oscillator amplifier of the above described system.

We claim:

1. A dual range VHF superheterodyne radio receiver adapted for reception on two adjacent bands having a radio frequency amplifying section and first detector section, an oscillator section, and an IF amplifier section, said radio frequency amplifying section being characterized in having a double peaked frequency response curve with the peaks falling each substantially in the centers of two adjacent reception bands, said oscillator section comprising a crystal oscillator having two sets of switchable crystals one set for reception of low band stations providing oscillations on the low frequency side of selected stations in said low band and the other set for reception of high band stations providing oscillations on the high frequency side of selected stations in said high band, and an amplifier stage in said oscillator section fed with said oscillations and having a load circuit coupled to said detector stage said load circuit comprising two coupled resonant circuits coupled primarily by direct inductance coupling which is adjustable to that degree of greater than critical coupling providing two resonant responses one response being displaced on the low frequency side of the lower frequency response peak of said radio frequency amplifying and detecting section by an amount substantially equal to the frequency of said IF amplifier and the other response being displaced on the high frequency side of the upper frequency response peak of said radio frequency amplifying and detecting section by an amount substantially equal to the frequency of said IF amplifier.

2. A dual range VHF superheterodyne receiver as claimed in claim 1 wherein said load circuit for said oscillator section amplifier comprises first and second adjustable inductance coils of substantially the same nominal inductance value and so spaced as to have low mutual inductance coupling therebetween, a common inductance winding having one end connected in common to the two corresponding ends of said first and second inductance coils and the other end connected to a point of reference potential, first capacitance means connected between the free end of said first inductance coil and said point of reference potential, and second capacitance means connected between the free end of said second inductance coil and a selectable tapping position on said common inductance winding.

References Cited

UNITED STATES PATENTS

| | | | |
|---|---|---|---|
| 2,390,768 | 12/1945 | Austin et al. | 330—154 |
| 2,947,860 | 8/1960 | Alvernaz | 325—453 XR |
| 2,967,235 | 1/1961 | Brau et al. | 325—453 XR |
| 3,292,099 | 12/1966 | Dome | 330—154 |

WILLIAM C. COOPER, *Primary Examiner.*

U.S. Cl. X.R.

325—462, 465; 330—154